United States Patent [19]

Sippel

[11] 4,197,005
[45] Apr. 8, 1980

[54] FILM HOLDER FOR A COPY CAMERA

[75] Inventor: Charles P. Sippel, Villa Park, Ill.

[73] Assignee: LogEtronics Incorporated, Springfield, Va.

[21] Appl. No.: 969,751

[22] Filed: Dec. 14, 1978

[51] Int. Cl.² ............... G03B 27/60; A45D 42/14; F16B 47/00

[52] U.S. Cl. ............... 355/73; 248/363; 355/76

[58] Field of Search ............ 355/73, 76, 92, 91; 248/363

[56] References Cited

U.S. PATENT DOCUMENTS

| 1,945,481 | 1/1934 | Dilkes | 248/363 |
| 2,895,706 | 7/1959 | Blatherwick | 355/73 X |
| 3,028,786 | 4/1962 | Wanielista et al. | 355/76 |
| 3,068,748 | 12/1962 | Schutt et al. | 355/71 |
| 3,107,078 | 10/1963 | Schutt | 355/73 X |
| 3,433,567 | 3/1969 | MacPhee et al. | 355/76 |
| 3,734,615 | 5/1973 | Wally, Jr. | 355/76 |
| 3,759,613 | 9/1973 | Denis | 355/73 |
| 3,762,816 | 10/1973 | Wally, Jr. | 355/73 |
| 4,043,663 | 8/1977 | Lein | 355/73 |
| 4,089,603 | 5/1978 | Jacobs | 355/73 |

Primary Examiner—Richard A. Wintercorn
Attorney, Agent, or Firm—K. L. King

[57] ABSTRACT

The conventional rear ground glass and vacuum back of a copy camera is replaced by an optically transparent platen and a flexible vacuum curtain. The vacuum curtain acts both as a copy viewing screen and as a photographic film or paper retainer. A vacuum channel with vacuum passageways is defined around the perimeter of the optically transparent platen to exhaust the air between the vacuum curtain and the transparent platen to thereby retain the light sensitive material to be exposed therebetween. The vacuum curtain is mounted on a roller that engages the transparent platen as the curtain is unrolled and rerolled over the sheet of photographic material.

10 Claims, 3 Drawing Figures

FILM HOLDER FOR A COPY CAMERA

BACKGROUND OF THE INVENTION

The present invention relates to vacuum film holders for large copy cameras such as graphic arts cameras, photomechanical cameras and the like. The conventional means of securing the film to be exposed is via a vacuum back having a plurality of apertures defined therein, as is typified by U.S. Pat. Nos. 1,945,481; 2,895,706; 3,107,078 and 3,759,613. These references are representative of a large number of prior art patents which disclose vacuum film holders for use in copy cameras or graphic arts cameras.

The present invention is distinguished from this group of prior art patents in that it eliminates the conventional vacuum back. The vacuum back of the prior art served both to retain the film in its proper position and to define the focal reference plane within the camera. In the present invention, the focal reference plane is defined by an optically transparent, rigid and planar platen member which receives the photographic material to be exposed. The sensitized material is secured against this platen member by unrolling a transparent flexible vacuum curtain across its planar surface. A vacuum channel with vacuum passageways is arranged around the perimeter of the optically transparent platen member to evacuate the air between the vacuum curtain and the backing member to enable atmospheric air pressure to force the vacuum curtain against the sensitized material and thereby retain the material at the desired focal plane in the camera.

The use of an optically transparent backing member is known from the prior art, with examples being disclosed in U.S. Pat. Nos. 3,028,786; 3,734,615 and 3,762,816. However, U.S. Pat. Nos. 3,734,615 and 3,762,816 to Joseph H. Wally, Jr., relate to a condenser lens and assembly for securing a piece of photographic film to be copied. This is in contrast to applicant's invention, which retains a sheet of photographic material which is to become the copy. In the Wally patents, the image originates at the film and passes through the transparent member, whereas in applicant's invention the aerial image originating at the copyboard passes through the transparent member to the photographic material. U.S. Pat. No. 3,028,786 to W. Wanielista, assigned to the assignee of the present application, discloses a glass insert for use in a frame defining a vacuum channel around the glass insert. However, neither this reference nor either of the Wally references disclose the use of a flexible vacuum curtain or the use of an engagement means to force said curtain into engagement with the transparent platen.

It is also known in the prior art to provide a mechanical device for applying a flexible halftone screen over the vacuum back of a copy camera. Examples of this type of device are disclosed in U.S. Pat. Nos. 3,068,748; 3,433,567; and 4,043,663. In each of these references a halftone screen is disposed over the film which is positioned immediately adjacent the vacuum back, and the air between the film and the halftone screen is evacuated through openings in the vacuum back arranged around the exterior edges of the film. In two of these references, U.S. Pat. Nos. 3,068,748 and 4,043,663, roller means are used to force the halftone screen into engagement with the film and vacuum back to thereby remove air trapped therebetween.

Applicant's invention may be contrasted with the above references in that the prior inventors used the conventional vacuum back referred to previously. Furthermore, the references do not disclose the use of a rigid transparent platen to provide precise film focal plane registration. The halftone screens are not the equivalent of applicant's vacuum curtain in that a halftone screen is not transparent and does not provide a diffusing surface for displaying a viewable aerial image. Finally, the halftone screen is arranged between the film emulsion and the camera lens, whereas applicant's vacuum curtain is arranged on the base side of the sensitized material.

U.S. Pat. No. 4,089,063, issued to Robert Jacobs on May 16, 1978, discloses a fast-acting vacuum support assembly using a movable, optically transparent, rigid backing member and a flexible plastic sheet. However, this reference also uses a conventional back plate assembly to provide film focal plane registration for the movable member. Before the exposure is made, the transparent backing member is moved into engagement with the film, via the platen motor. In the Jacobs invention the glass plate is used expressly ". . . as the support platen rather than a back plate . . ." so that "-an optically flat back plate is not required . . ." Applicant's invention, on the other hand, uses the transparent, rigid, planar platen member as the back plate to maintain the film in a precise focal plane. In the Jacobs invention, the flexible plastic sheet is opaque rather than transparent and does not provide a diffusing surface to display the aerial image thereon. Furthermore, there is no engagement means of the type disclosed in applicant's invention to remove air trapped between the flexible plastic sheet and the film. Finally, if one were to remove the back plate assembly of the Jacobs reference, there would be no fixed focal plane reference for the photographic image.

SUMMARY OF THE INVENTION

It is an object of the present invention to provide a simple, inexpensive means for positioning and securing large sheets of film in a copy camera. The present invention provides a lightweight, low cost film back that does not require precise machining as do conventional vacuum backs. Further, the moving parts of applicant's invention are inexpensive and can easily be replaced in the field.

Applicant's invention uses less floor space than a conventional vacuum back camera because no space need be reserved for a cumbersome swinging or rotating back.

Applicant's invention allows for the accurate and simultaneous positioning of several pieces of cut film, particularly orthochromatic graphic arts film, at different locations on the transparent backing platen. The film may be manipulated behind the partially-open vacuum curtain until it coincides exactly with the desired film position indicia reproduced on the curtain.

Applicant's invention will retain several sheets at the same time, even when each sheet of film has a different thickness. This multiple sheet retention feature makes possible quick and inexpensive replication of multiple images.

Applicant's invention will accommodate curled film, or the overlapping sheets of film used in special posterization effects.

A further object of the present invention is to provide a simple, inexpensive means for securing large sheets of photographic film in a copy camera. The film is placed on an optically transparent, rigid, planar platen member and is secured in position by a transparent mylar vacuum curtain. This vacuum curtain acts both as the ground glass or copy viewing screen and as the film or paper holder, thereby eliminating the need for the conventional ground glass and vacuum camera back. The invention saves space, and is easier to use. The film or paper is simply placed against the glass backing member, and the vacuum curtain is unrolled into place over it. The film or paper, regardless of its size or thickness, is held in place by atmospheric air pressure and the vacuum curtain has image dimension markings for accurate copy sizing and positioning.

DETAILED DESCRIPTION OF THE PREFERRED EMBODIMENT

Figure 1:
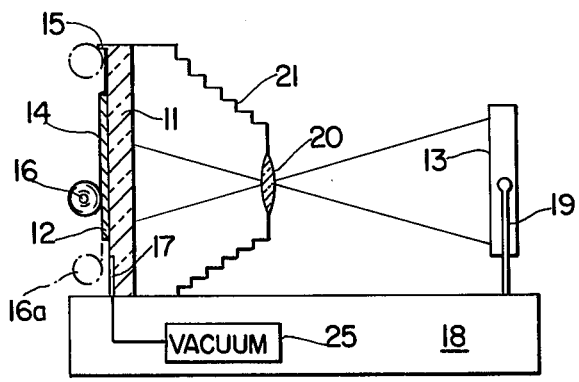
FIG. 1 is a diagrammatic side view of the copy camera embodying the invention and illustrating the optically transparent backing member, the vacuum curtain, and the film retention means.

FIG. 1 illustrates the film holder of the present invention, intended for use in a vertical or horozontal copy camera or graphic arts camera or other photomechanical camera of the type used to expose large sheets of sensitized film or paper. The invention includes an optically transparent, rigid, planar platen member 11 positioned in the camera to receive a sheet of photograhic material 12. Platen member 11 is arranged between film sheet 12 and lens 20, so that the aerial photographic image from lens 20 passes through the transparent rigid backing member 11 to the film 12. A transparent and flexible vacuum curtain 14 having either integral or surface light diffusing characteristics is affixed along one edge 15 to one planar edge of rigid platen member 11.

The vacuum curtain has a planar surface bearing image dimension marks to aid in the accurate positioning of the sensitized material prior to exposure. The light diffusing surface is placed immediately adjacent the glass platen member 11 to display the aerial photograhic image passing through the camera. Roller means 16 is used for unrolling and rerolling the transparent flexible vacuum curtain from engagement with rigid member 11. The roller means 16 is mounted to traverse the planar surface of the plate member to roll out any air entrapped between flexible member 14 and platen member 11.

The present invention also includes a vacuum means arranged around the perimeter of the rigid platen member 11 to evacuate air entrapped between the flexible vacuum curtain 14 and platen 11. The air is rolled to the exhaust means by means of roller 16 as it traverses the planar surface of member 11. The camera also defines a support frame 18 and a copystand 19 to display the image 13 to be photographed. In addition, the copy camera includes a lens member 20, and light-tight bellows 21, to provide for accurate focussing of the image to be photographed. It is to be understood that the remaining mechanical elements of the camera, needed to provide for precise focussing of the lens and lighting of the image to be photographed, are not part of the present invention and, accordingly, are not illustrated in FIG 1. FIG. 1 does, however, illustrate the vacuum curtain 14 as it is being unrolled across the face of the rigid platen member 11 and film 12. When curtain 14 has completely traversed the planar surface, it will stop at the position illustrated by 16a.

The present invention provides a lightweight, inexpensive film-holding means for a copy camera that eliminates the large bulky vacuum back of a conventional copy camera. The entire assembly is illustrated in isometric form in FIG. 2, where photographic film 12 has been partially inserted under vacuum curtain 14 and in register with the image dimension marks 22. This makes the precise positioning of the sheet of sensitized material very quick and convenient.

In using the device, the operator first unrolls vacuum curtain 14 and focuses and composes the image on it, using the dimension marks as a guide in precisely positioning the image. After the image has been foucussed on the light-difussing surface of curtain 14, the curtain is rerolled and the sheet of photographic film is placed with its emulsion immediately adjacent rigid platen member 11. The operator then grasps handle 23 mounted on carrier 24 and draws roller 16 downward, across the photographic film or paper. In so doing the air bubbles 12a that may have formed between the photographic film and glass platen 11 are rolled out from beneath the photographic film. Similarly, any air bubbles that might have formed between photographic film 12 and vacuum channel 17 are rolled to the vacuum channel and exhausted by vacuum pump 25.

One of the disadvantages of a flexible vacuum curtain used by itself is that air immediately adjacent the vacuum channel is exhausted, whereupon the vacuum curtain collapses against the platen immediately adjacent the vacuum channel. This causes any other air bubbles that may be present under the vacuum curtain, such as the air bubble 12a under the sheet of film 12, to be trapped and incapable of being exhausted because of the seal already formed between vacuum curtain 14 and glass plate 11. In the present invention, however, applicant's engagement means 16 defines a roller which rolls the air bubbles outwardly as it traverses the planar surface of backing member 11. Thus any air bubbles trapped between either vacuum curtain 14 and film platen 11, or between film 12 and platen 11, are rolled out downward or to the side, and are exhausted by vacuum channel 17.

The transparent film platen 11 is supported at the precise photographic focal plane of lens 20 by means of a hollow frame member 26 which, in turn, is supported by camera back support 18a. Copyboard 13 and lens 20 are individually movable relative to support 18a. to provide for the degree of enlargement or reduction necessary in the copy, but once the camera has been squared and the image size established the relative positions of these members remain stationary. The transparent backing member 22 thereby defines the precise focal plane for the photographic image during the subsequent exposure of film or paper.

Figure 2:
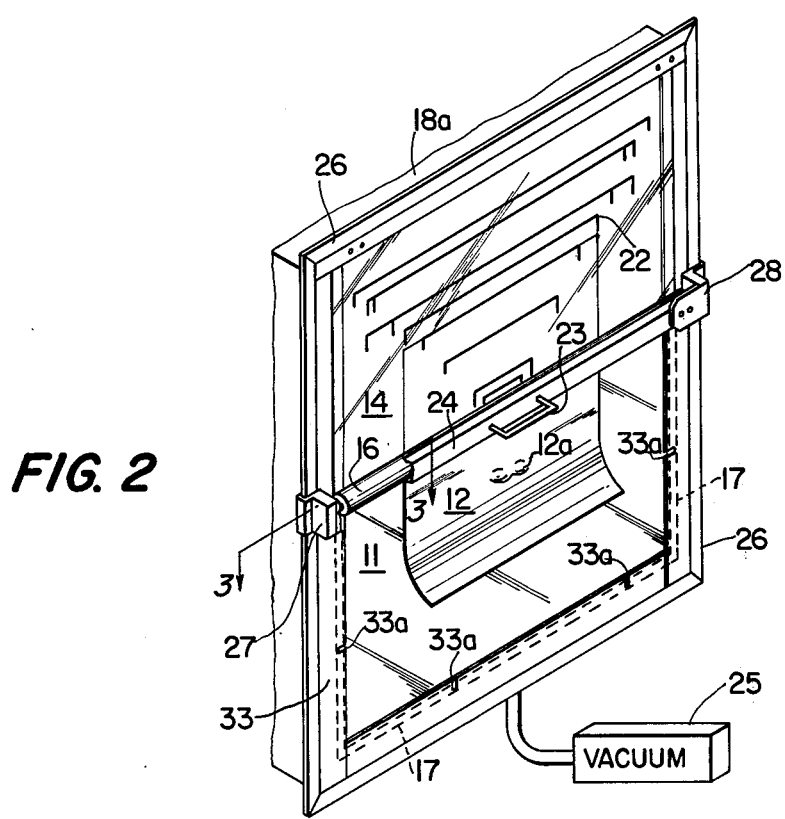
FIG. 2 is an isometric view of the film holder constituting the invention, illustrating the manner in which the vacuum curtain is unrolled and drawn over a sheet of sensitized material.
Figure 3:
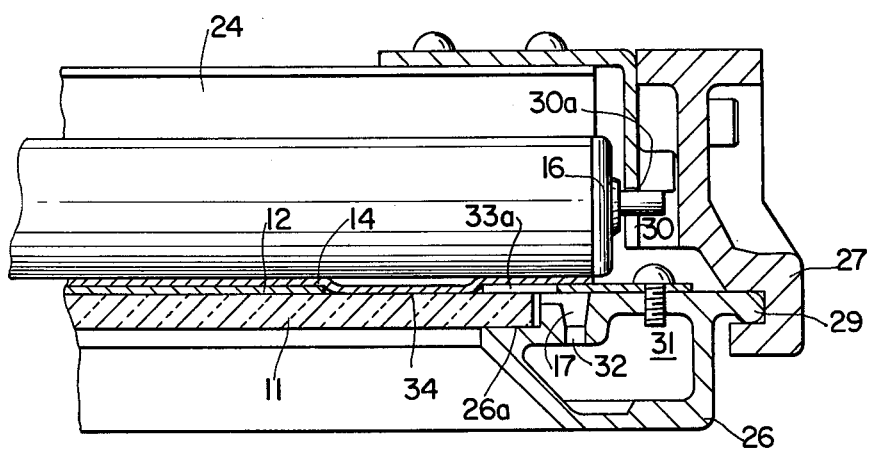
FIG. 3 is a cross-sectional view taken along Section Line 3—3 in FIG. 2.

FIG. 3 is a cross-sectional view taken along Section Line 3—3 of FIG. 2. It illustrates the hollow frame member 26, the optically transparent rigid platen member 11, the flexible vacuum curtain 14, a sheet of photographic film 12, the engagement roller 16 and the carrier 24. Carrier 24 is suspended in two sliding guides 27 and 28, arranged on opposite sides of glass platen 11. This allows the roller to completely traverse the planar surface of glass platen 11 as it is drawn downward as illustrated in FIG. 2. The guide 27 slides on flange member 29 defined by the hollow frame member 26 and also supports roller 16 by means of a slot 30 defined in guide 27.

The upper edge of slot 30, defined at 30a, provides a bearing surface for transmitting pressure from carrier 24 and channel guide 29 to roller 16, whereby the roller is urged into engagement with platen 11. Roller 16 may be a common window shade roller having a spring powered return means therein (not shown) for counterbalancing a portion of roller weight at any desired location on platen 11, and for assisting in rerolling curtain 14, when required.

The hollow frame member 26 defines a vacuum plenum 31 which communicates with the vacuum channel 17 through a plurality of openings 32 defined by the hollow frame member. In the preferred embodiment, these openings are holes drilled through the hollow frame member, but could be slots or any other form of air passageway between channel 17 and plenum 31. The rigid transparent platen 11 is mounted within hollow frame 26 by means of a recessed portion 26a defined by the hollow frame immediately adjacent vacuum channel 17. Thus, channel 17 extends around the perimeter of the transparent plate 11 to provide an access route for air trapped in any direction between the vacuum curtain 14 and member 11. Transparent platen 11 is secured within recess 26a, defined by the hollow frame member 26, by means of a retaining clamp member 33 which also extends around the perimeter of the rigid optically transparent platen member 11. Clamping member 33 has a plurality of slots 33a defined therein to provide air passageways between the upper surface of platen 11 and the vacuum channel 17.

As can be seen in FIG. 3, the flexible vacuum curtain 14 has collapsed against the glass platen 11, as indicated at 34, completely exhausting any air therebetween. The atmospheric air pressure then provides a retaining pressure against the outer surface of vacuum curtain 14 to force the curtain against the film 12 and urge it into engagement with glass platen 11. While the preferred embodiment of the invention has been described in detail, it is to be understood that various modifications and alterations could be made without departing from its spirit. Accordingly, the invention is limited only insofar as is defined by the scope of the following claims.

What is claimed is:

1. A film holder for a copy camera, said film holder comprising:
   a. an optically transparent, planar and rigid platen member for receiving a photograhic film sheet, said member arranged between the film sheet and an image to be photographed so that the aerial image will pass through said transparent platen member to said film,
   b. a transparent, flexible sheet member, said member being affixed along a first edge to a first planar edge of said rigid backing member,
   c. engagement means to apply said flexible member to said rigid platen member, said means mounted to traverse the planar surface of said rigid platen member and sequentially force said flexible member into engagement with said rigid platen member,
   d. means, arranged around the perimeter of said transparent rigid platen member, for drawing a vacuum to evacuate air entrapped between said flexible and said rigid members as said engagement means traverses the planar surface of said rigid platen member, whereby atmospheric air pressure will urge said flexible member against said rigid platen member to retain a photographic film sheet placed therebetween.

2. A film holder for a copy camera as claimed in claim 1, wherein said engagement means includes,
   a. a roller means for unrolling and rerolling said flexible sheet member, said roller means being mounted to traverse one planar surface of said planar, rigid platen member, said roller also having said flexible sheet member affixed thereto to unroll and reroll said flexible sheet member as said roller traverses said rigid planar surface.

3. A film holder for a copy camera as claimed in claim 1, wherein said flexible sheet member further comprises a thin, translucent sheet, said sheet having one planar surface provided with image dimension indicia and the other planar surface being light diffusing, wherein said diffusing surface provides a rear projection viewing screen for the aerial photographic image passing through the rigid transparent platen member.

4. A film holder for a copy camera as claimed in claim 1, wherein said means for drawing a vacuum further comprises a hollow frame member surrounding said transparent platen member, a vacuum pump arranged to exhaust the air from a plenum defined by said hollow frame member, and a plurality of vacuum passageways defined by said hollow frame adjacent said rigid platen member, said passageways communicating with said hollow frame plenum through openings defined by said frame.

5. A film holder for a copy camera as claimed in claim 4, wherein said hollow frame member also defines a recessed portion adjacent to said passageways, said recess having mounted therein said rigid transparent platen member.

6. A film holder for a copy camera as claimed in claim 2, wherein said flexible sheet member further comprises a thin, translucent sheet, said sheet having one planar surface provided with image dimension indicia, and the other planar surface light diffusing, wherein said diffusing surface provides a rear projection screen for the aerial photographic image passing through the rigid transparent platen member.

7. A film holder for a copy camera as claimed in claim 2, wherein said means for drawing the vacuum further comprises a hollow frame member surrounding said transparent rigid member, a vacuum pump arranged to exhaust the air from a plenum defined by said hollow frame member, and a vacuum channel defined within said hollow frame adjacent said rigid backing member, said channel communicating with said hollow frame plenum through openings defined by said frame.

8. A film holder for a copy camera as claimed in claim 3, wherein said means for drawing a vacuum further comprises a hollow frame member surrounding said transparent rigid member, a vacuum pump arranged to exhaust the air from a plenum defined by said hollow frame member, and at least one vacuum passageway defined by said hollow frame adjacent said rigid backing member, said passageway communicating with said hollow frame plenum through openings defined by said frame.

9. A film holder for a graphic arts camera, said film holder comprising:
- a. an optically transparent, rigid planar platen member for receiving a photographic film sheet, said member arranged between the film sheet and an image to be photographed so that the aerial photographic image will pass through said rigid platen member to said film,
- b. a transparent, flexible sheet member, said member being affixed along one edge to one planar edge of said rigid platen member, said sheet having a light diffusing planar surface, said diffusing surface being mounted immediately adjacent said rigid transparent member to display an aerial photographic image passing through said rigid transparent member,
- c. roller means for rolling the transparent flexible member into engagement with said rigid member, said roller means being mounted to traverse the surface of said rigid planar member to roll out any air entrapped between said flexible and said rigid members,
- d. exhaust means, arranged around the perimeter of said rigid backing member, for drawing a vacuum to evacuate air entrapped between said flexible and said rigid members, said air being rolled to said exhaust means by said roller means as it traverses the planar surface of said rigid member, whereby atmospheric air pressure will urge said flexible member against said rigid member to retain a photographic film placed therebetween.

10. A film holder for a copy camera as claimed in claim 9, wherein said means for drawing a vacuum further comprises a hollow frame member surrounding said transparent rigid member, a vacuum pump arranged to exhaust the air from a plenum defined by said hollow frame member, and a vacuum channel defined within said hollow frame adjacent said rigid backing member, said channel communicating with said hollow frame plenum through openings defined by said frame.

* * * * *